United States Patent
Contreras et al.

(10) Patent No.: US 9,153,248 B1
(45) Date of Patent: Oct. 6, 2015

(54) HARD DISK DRIVE PREAMPLIFIER WITH WRITE DRIVER HAVING BYPASS CURRENT SOURCES FOR COMPENSATION OF WRITE HEAD MAGNETIC ASYMMETRY

(71) Applicant: HGST Netherlands B.V., Amsterdam (NL)

(72) Inventors: John Contreras, Palo Alto, CA (US); Zhihao Li, San Jose, CA (US); Joey Martin Poss, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/630,720

(22) Filed: Feb. 25, 2015

(51) Int. Cl.
*G11B 5/02* (2006.01)

(52) U.S. Cl.
CPC .................................... *G11B 5/02* (2013.01)

(58) Field of Classification Search
CPC .... G11B 5/02; G11B 5/012; G11B 20/10009; G11B 5/035; G11B 5/09; G11B 2220/90
USPC .......................................... 360/39, 46, 65, 67
See application file for complete search history.

(56) References Cited

U.S. PATENT DOCUMENTS

| | | | |
|---|---|---|---|
| 5,485,320 A | 1/1996 | Vogel et al. | |
| 6,285,221 B1 | 9/2001 | Leighton et al. | |
| 7,190,541 B2 | 3/2007 | Kuehlwein et al. | |
| 7,839,589 B2 | 11/2010 | Barnett et al. | |
| 7,848,044 B2 * | 12/2010 | Kokami et al. | 360/67 |
| 7,881,006 B2 | 2/2011 | Raghunathan et al. | |
| 8,687,311 B2 | 4/2014 | Dakroub et al. | |

* cited by examiner

*Primary Examiner* — Nabil Hindi
(74) *Attorney, Agent, or Firm* — Thomas R. Berthold

(57) ABSTRACT

A disk drive preamplifier (preamp) includes a write driver that has two pairs of programmable bypass current sources not connected to the write current source to compensate for the inherent magnetic asymmetry of the write head. One pair of the programmable bypass current sources provides a fixed bypass current in one direction. The other pair provides a fixed bypass current in the opposite direction. Prior to writing, only one of the pairs of bypass current sources is selected and programmed with the correct value of bypass current. When the write driver generates the positive and negative write current pulses during writing the selected bypass current sources provide a fixed offset to the amplitude of the write current pulses.

11 Claims, 5 Drawing Sheets

HARD DISK DRIVE PREAMPLIFIER WITH WRITE DRIVER HAVING BYPASS CURRENT SOURCES FOR COMPENSATION OF WRITE HEAD MAGNETIC ASYMMETRY

BACKGROUND OF THE INVENTION

1. Field of the Invention

The invention relates generally to magnetic recording hard disk drives (HDDs), and more particularly to an HDD read amplifier/write driver integrated circuit that compensates for write head asymmetry.

2. Description of the Related Art

HDDs typically include a main integrated circuit, which is typically a system-on-a-chip (SOC) that contains many of the electronics and firmware for the HDD. The SOC is connected by a transmission line on a flex cable to the HDD's read amplifier/write driver (preamp), which is typically implemented as an integrated circuit. The preamp is typically located on the actuator that moves the read/write heads to the selected data tracks on the disks. The data to be written by the write head is sent from the SOC to the preamp, where the write driver generates analog positive and negative write current pulses that are applied to the inductive coil in the write head to write data by selectively magnetizing the magnetic media of the recording layer on the disk. The data read back from the disk by the read head is transmitted from the preamp to the SOC.

The write head will typically have inherent magnetic asymmetry, meaning that even if the positive and negative write current pulses are perfectly symmetric the magnetic fields applied to the disk will not be properly shaped. This will cause an asymmetric waveform when the data is read back, resulting in soft errors in the readback data. The inherent magnetic asymmetry of the write head is caused by variations in the manufacturing process, which results in variations in the shape of the write head.

To compensate for the inherent magnetic asymmetry of the write head, a higher write current or a variable overshoot current and/or variable overshoot current duration are required to generate an asymmetric write current waveform. The write current waveform has several parameters that can be controlled in the HDD by settings in the preamp. These waveform parameters include write current amplitude, write current rise and fall times, write overshoot current amplitude and write overshoot current duration. The write driver circuit in the preamp has dynamic switches to turn on these parameters with precision. U.S. Pat. No. 8,687,311 B2 describes a preamp that can adjust various parameters of the write current to alter the shape of the write current waveform to compensate for write head magnetic asymmetry.

However, to create an asymmetric write current waveform, these write parameters need to have high-speed asymmetric circuit current sources for each write parameter for high-speed writing. Although implementation of high-speed asymmetric current sources in the preamp is possible, the amount of circuitry involved to dynamically switch asymmetric write parameters increases the amount of integrated circuit area and slows down the generation of the write driver waveform.

What is needed is a preamp that can compensate for inherent write head magnetic asymmetry without directly altering the write current and thus without the need for high-speed asymmetric circuit current sources for each write parameter.

SUMMARY OF THE INVENTION

Embodiments of this invention relate to a preamplifier (preamp) with a write driver that has two pairs of programmable bypass current sources that are not connected to the write current source. The write driver includes a conventional H-bridge connected to the write current source and the write head coil and generates conventional symmetric positive and negative write pulses. One pair of the programmable bypass current sources is connected to the write head to provide a fixed bypass current in one direction. The other pair is also connected to the write head and provides a fixed bypass current in the opposite direction. A calibration process determines the magnetic asymmetry of the write head during manufacturing. Then one of the pairs of bypass current sources is selected and programmed with the correct value of bypass current. When the write driver H-bridge generates the write current pulses the selected bypass current sources provide a fixed offset to the amplitude of the positive and negative write current pulses. This compensates for the inherent magnetic asymmetry of the write head, but without directly altering the write current.

The preamp is typically connected to multiple write heads and includes a register for storing digital values sent from the disk drive's system-on-a-chip (SOC). During a calibration process the magnetic asymmetry of each write head is determined. This determines the direction and amount of magnetic asymmetry for each write head, so that the proper pair of bypass current sources can be selected and the value of bypass current calculated. The SOC then sends digital values to the register that identifies the selected pair of bypass current sources and represents the value of bypass current to be used for each write head. A digital-to-analog converter (DAC) generates an analog value of the bypass current from the digital value in the register. When a particular write head is selected for writing, a current controller connected to the register and the DAC generates the appropriate value of bypass current to the selected pair of bypass current sources for that write head.

For a fuller understanding of the nature and advantages of the present invention, reference should be made to the following detailed description taken together with the accompanying figures.

DETAILED DESCRIPTION OF THE INVENTION

Figure 1:
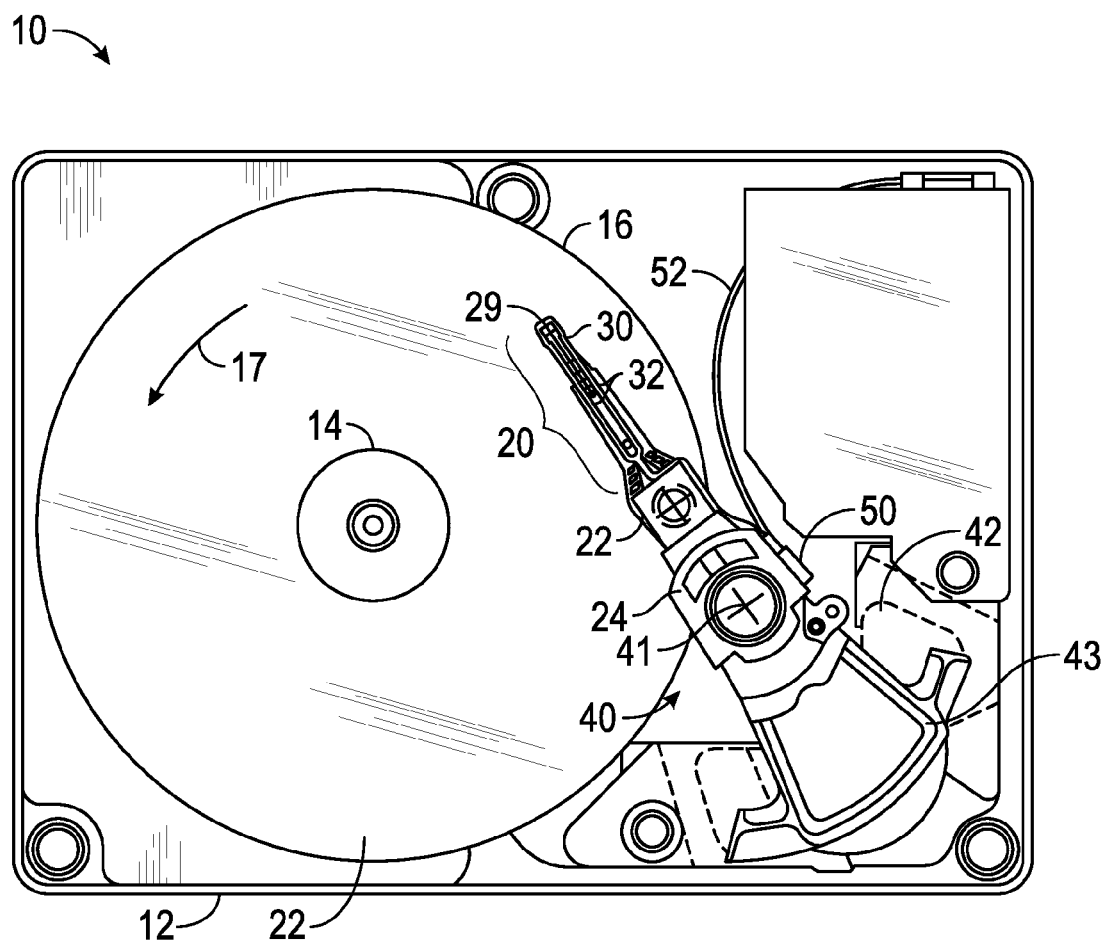
FIG. 1 is a top plan view of a head/disk assembly (HDA) of a magnetic recording hard disk drive that may include embodiments of the invention.

FIG. 1 is a top plan view of a head/disk assembly (HDA) of a hard disk drive (HDD) 10 that may include embodiments of the invention. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. Disk drive 10 also includes a rotary actuator assembly 40 rotationally mounted to the base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. Each load beam assembly 20 has an integrated lead suspension (ILS) 30 with an array of electrically conductive lines or traces 32 that connect to a read/write head 29. The traces 32 connect at one end to the read/write head 29 and at the other end through a short flex cable to a read amplifier/write driver 50 (preamp), which is typically implemented as an integrated circuit, secured to a side of the E-block 24. Each read/write head 29 includes an inductive write head (not shown) and a magnetoresistive read head (not shown). The preamp 50 receives write data input signals from the disk drive's system-on-a-chip (SOC) (not shown) that is typically located on the back side of base 12. The SOC is connected to preamp 50 by a flex cable 52 and through its electronic packaging, printed circuit board, and flex connector (not shown). While only one disk surface and associated head is depicted in FIG. 1, there are typically multiple disks and associated heads/load beam assemblies.

Figure 2:
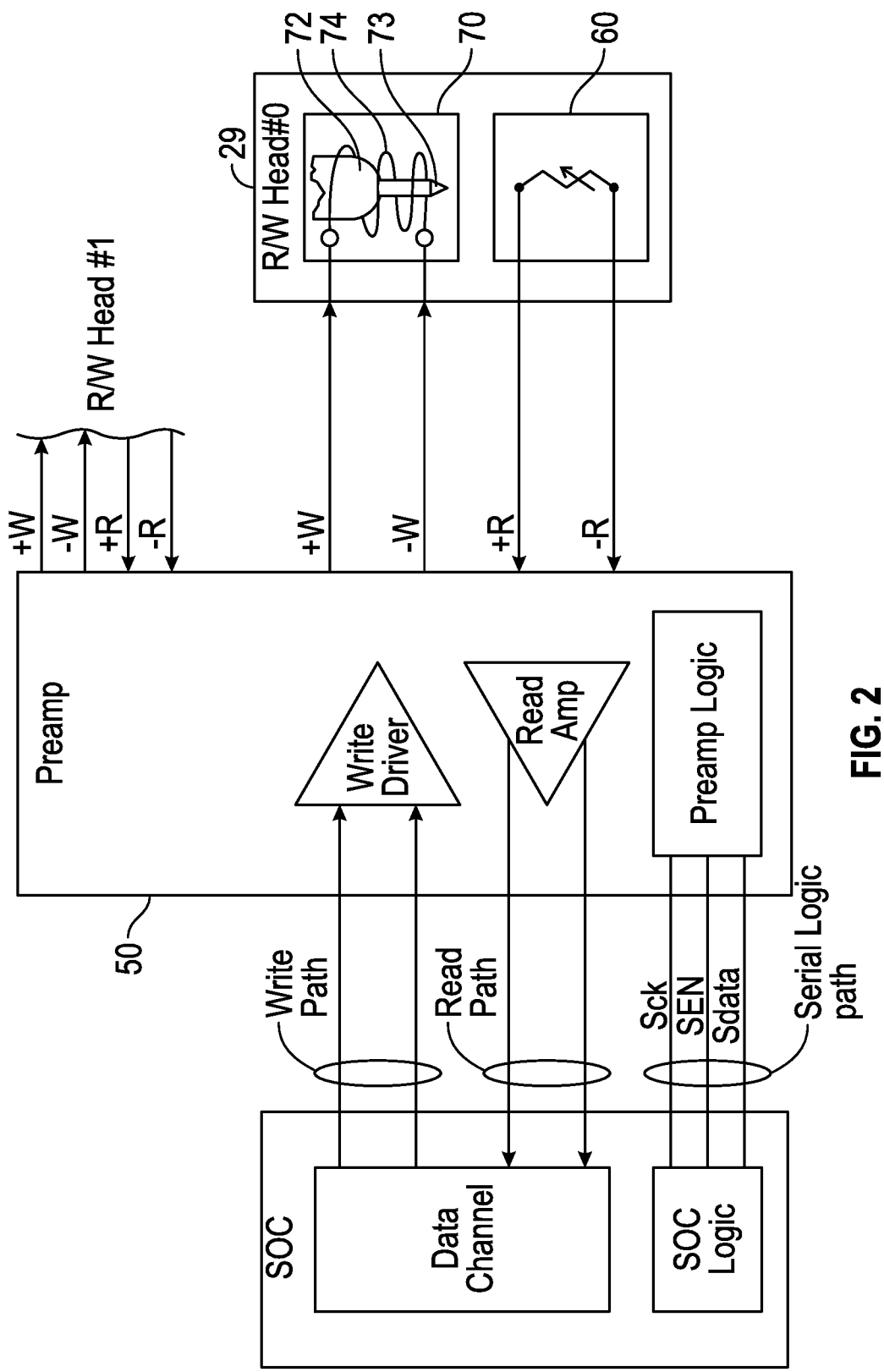
FIG. 2 is a highly schematic diagram of a system-on-a-chip (SOC) and a preamplifier integrated circuit connected to read/write heads that may include embodiments of the invention.

FIG. 2 is a highly schematic block diagram showing the connection of the SOC to the preamp 50 and its connection to one read/write head 29 (R/W Head #0). However, the preamp 50 typically includes multiple ports for controlling multiple heads, as depicted by its connection to a second read/write head (R/W Head #1). The SOC includes a Data Channel with a Read path that includes two lines and a Write path that includes two lines. The Read and Write paths form a transmission line between the SOC and the preamp 50. The transmission line is typically formed on a flex cable. The SOC also includes SOC Logic circuitry connected to a common Serial Logic path on the flex cable for sending commands to Preamp Logic circuitry in the preamp 50. The Serial Logic path includes a clock (SClk) line, a serial enable (SEN) line and a serial command or data (SData) line. The commands are used to set registers (not shown) in the preamp 50 with values for parameters that control the functions of the preamp 50.

The preamp 50 includes a Write Driver, a Read Amplifier and Preamp Logic, and is connected to the read/write (R/W) head 29 by a short flex cable and the ILS. The R/W head 29 includes magnetoresistive read head 60 and inductive write head 70. The write head 70 includes a magnetic write pole 72 with pole tip 73 coupled to coil 74. Write current pulses from the Write Driver to the coil 74 cause magnetization reversals in the write pole 72 to thereby magnetize regions of the disk, resulting in the writing of data bits to the disk.

As described previously, variations in the manufacturing process of the write head cause variations in the geometry of the write pole, for example the pole thickness and taper angle of the pole tip. This inherent magnetic asymmetry of the write head must be compensated by altering the shape of the write pulses so that the data bits are written symmetrically. This assures that the readback waveform will have the proper shape, thus minimizing soft errors in the readback data.

In embodiments of this invention the write driver includes two pairs of programmable bypass current sources that are not connected to the write current source. One pair is connected to terminals connected to the write head to provide a fixed bypass current in one direction. The other pair is also connected to the terminals connected to the write head and provides a fixed bypass current in the opposite direction. A calibration process determines the magnetic asymmetry of the write head during manufacturing. Then one of the pairs of bypass current sources is selected and programmed with the correct value of bypass current. When the write driver generates the write current pulses the selected bypass current sources provide a fixed offset to the amplitude of the positive and negative write current pulses. This compensates for the inherent magnetic asymmetry of the write head, but without directly altering the write current.

Figure 3A:
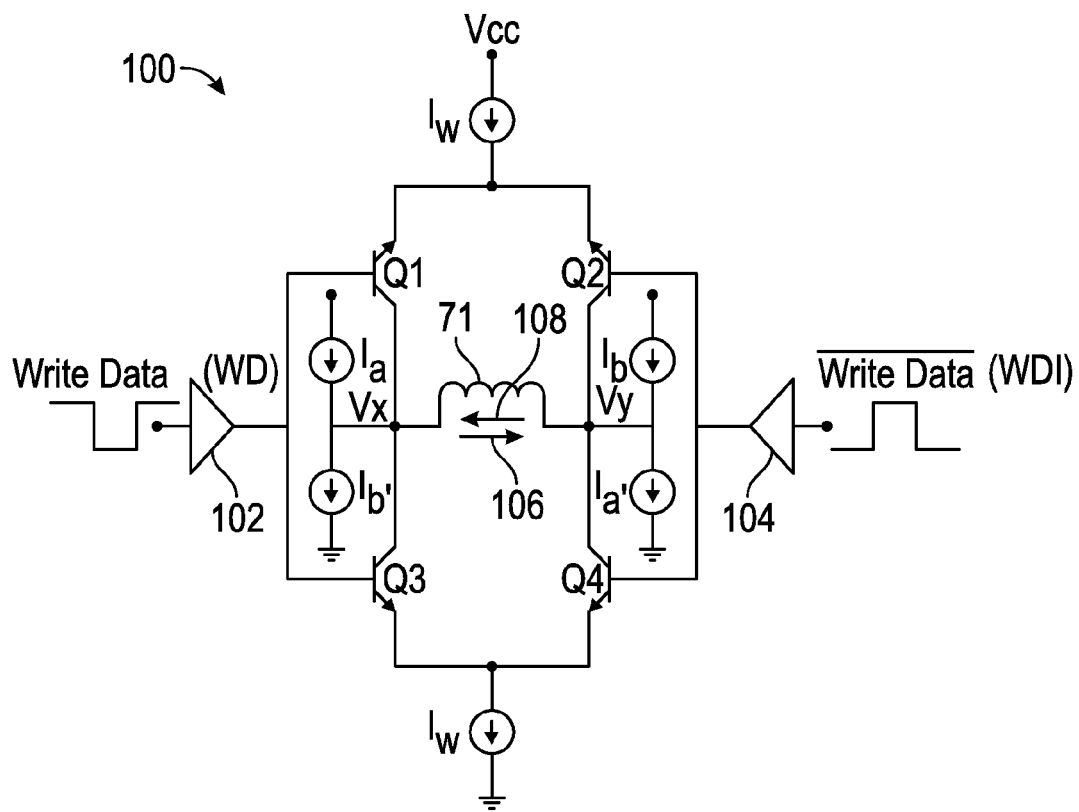
FIG. 3A is a schematic of the write driver according to an embodiment of the invention.
Figure 3B:
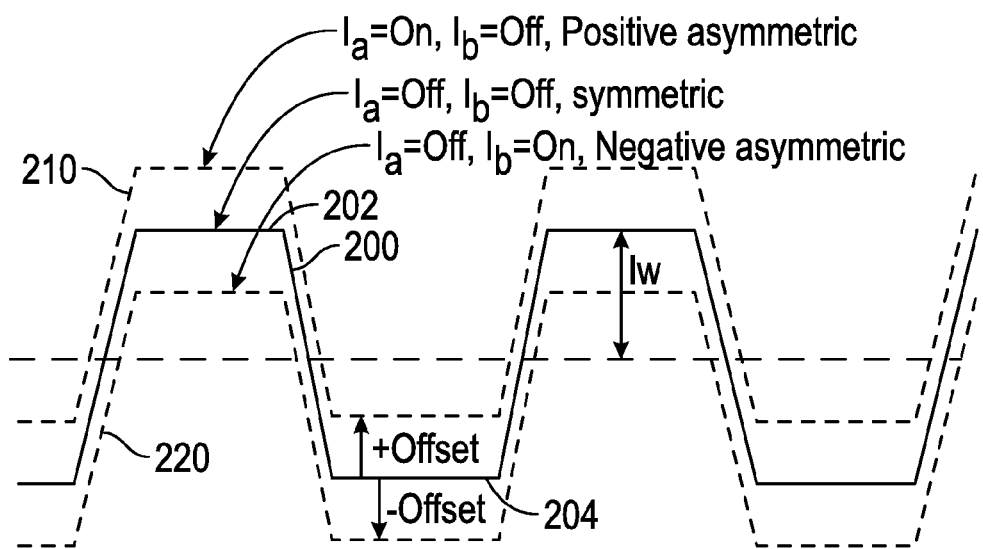
FIG. 3B is a graph of the write current pulses generated by the write driver with and without the bypass currents generated by embodiments of the invention.

FIG. 3A is a schematic of the write driver according to an embodiment of the invention. FIG. 3B is a graph of the write current pulses generated by the write driver with and without the bypass currents generated by embodiments of the invention. The write driver 100 includes a conventional H-bridge connected to the coil 71 of the write head at terminals Vx and Vy. One side of the H-bridge includes switches represented as transistors Q1 and Q3 connected to a buffer 102 that receives the write data (WD) signal. The other side of the H-bridge includes switches represented as transistors Q2 and Q4 connected to a buffer 104 that receives the inverse of the write data (WDI) signal. The H-bridge generates conventional symmetric write pulses as shown in FIG. 3B by waveform 200 with a positive write pulse 202 and negative write pulse 204. When WD is low, WDI is high and Q2 and Q3 are off, so write current (Iw) passes from Q1 to Q4 through the write coil 71 in the direction shown by arrow 106, which can be considered the positive write pulse 202. When WD is high, WDI is low and Q1 and Q4 are off, so Iw passes from Q2 to Q3 through the write coil 71 in the direction shown by arrow 108, which can be considered the negative write pulse 204.

The write driver 100 includes two programmable pairs of bypass current sources that are not connected to the Iw current source. A first pair Ia and Ia' is connected to terminals Vx, Vy and is capable of providing a fixed DC bypass current through the coil 71 in the direction 106. A second pair Ib and Ib' is connected to terminals Vx, Vy and is capable of providing a fixed DC bypass current through the coil 71 in the direction 108. The push-pull DC current sources in each pair are matched in value, but only one pair is selected and used for each write head, depending on the magnetic asymmetry of that write head. For example, if during calibration it is determined that the write head is magnetically asymmetric so that when the symmetric write current waveform 200 is applied, the write head produces a stronger magnetic field in the "negative" direction, then the bypass current pair Ia, Ia' is selected and programmed with the correct amount of bypass current so as to produce the waveform 210 with a "positive" offset. Similarly, if the bypass current pair Ib, Ib' were to be selected and programmed with the correct amount of bypass current, the waveform 220 with a "negative" offset would be produced. The selected pair of bypass current sources is active whenever the data is being written so the bypass current sources provide a fixed bypass current during all transitions and are thus not dependent on the write data signal.

Figure 4:
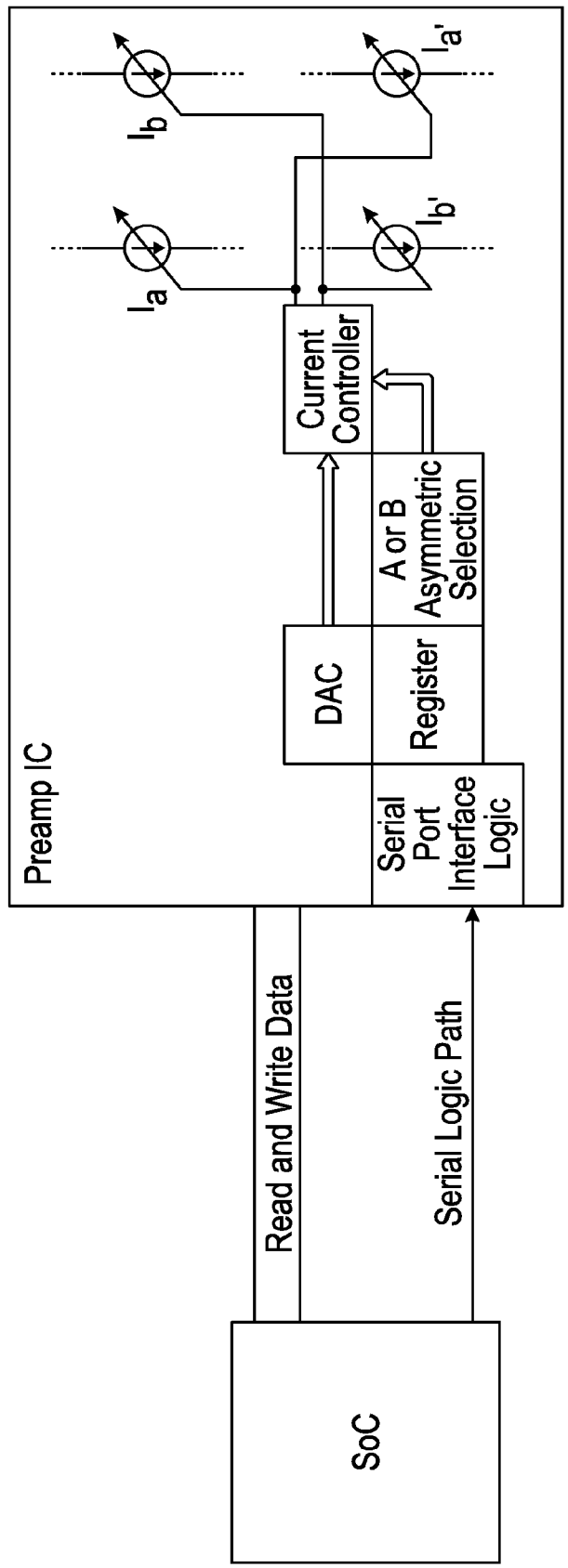
FIG. 4 is a block diagram of the preamp with write driver according to an embodiment of the invention connected to the disk drive SOC for illustrating selection of the pair of bypass current sources programmed with the correct value of bypass current.

FIG. 4 is a block diagram of the preamp with write driver according to an embodiment of the invention connected to the disk drive SOC and illustrates the manner in which the appropriate pair of bypass current sources is selected and programmed with the correct value of bypass current. The preamp includes a register for storing digital values sent from the SOC on the serial logic path to program various parameters of the preamp. A serial port interface logic block is located in the preamp between the SOC and the register. During a calibration process for each write head, which is performed during disk drive manufacturing, but also optionally in the disk drive at other times when the disk drive is idle, the magnetic asymmetry of each write head is determined. This determines the direction and amount of magnetic asymmetry, so that the proper pair of bypass current sources can be selected and the value of bypass current calculated. The SOC then sends digital values to the register that identifies the selected pair of bypass current sources and represents the value of bypass current to be used for each write head. A digital-to-analog converter (DAC) generates an analog value of the bypass current from the digital value in the register. A current controller is connected to the register and the DAC and generates the appropriate value of bypass current to the selected pair of bypass current sources for that write head. Because the preamp is typically connected to multiple write heads, the register would contain bypass current pair selection values and current values for all of the write heads, with the appropriate values being recalled from the register when a particular write head is selected for writing.

Figure 5A:
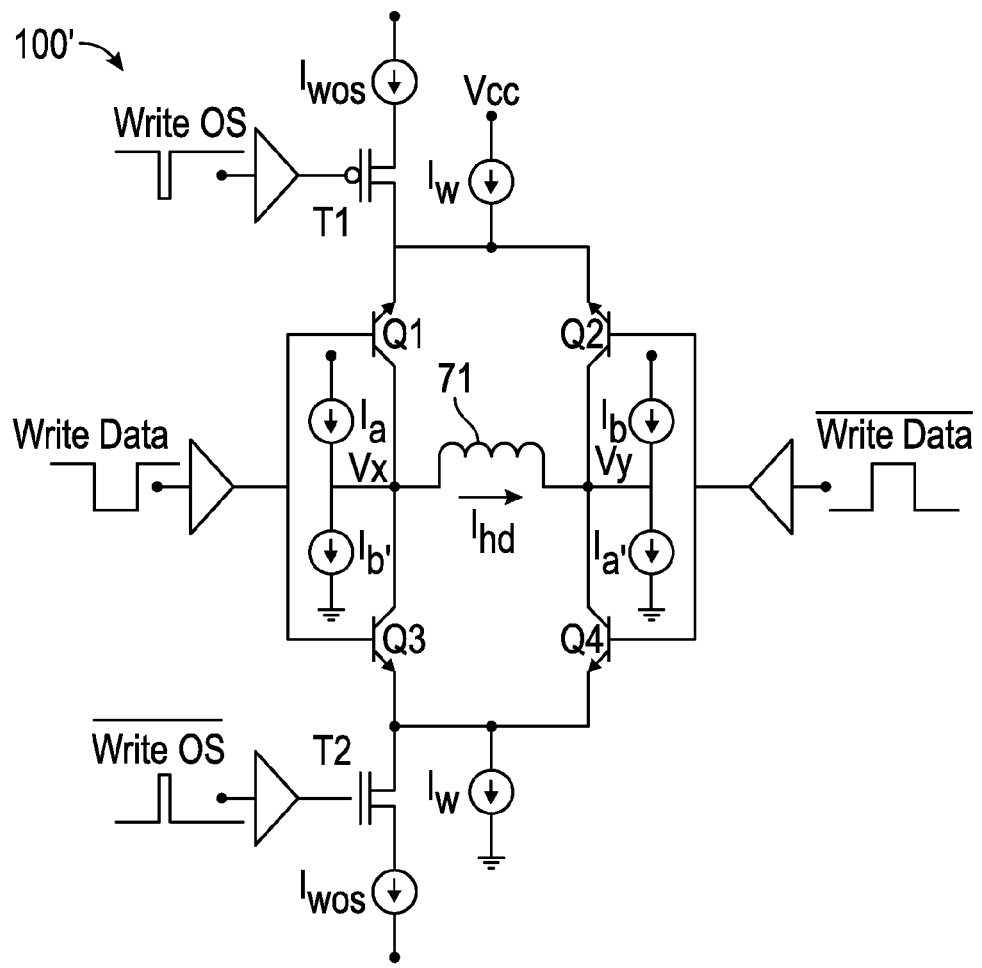
FIG. 5A is a schematic of the write driver according to an embodiment of the invention with write overshoot current (Iwos).
Figure 5B:
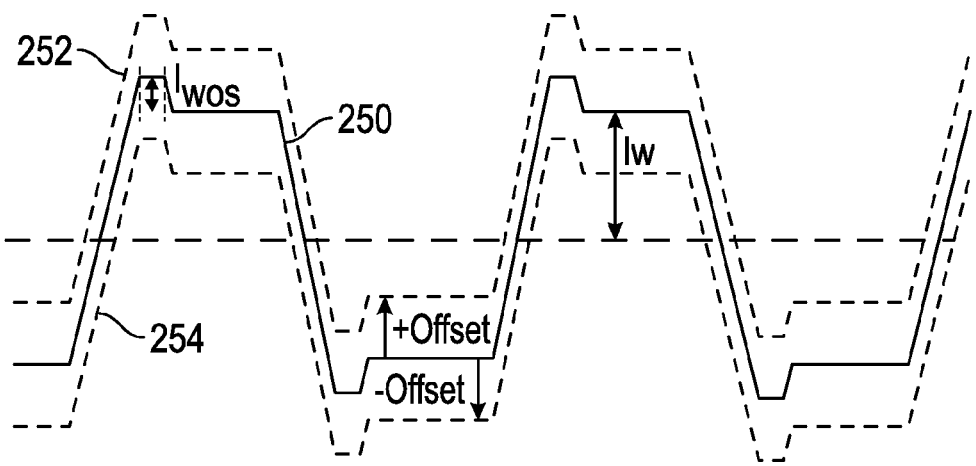
FIG. 5B is a graph of the write current pulses with Iwos generated by the write driver with and without the bypass currents generated by embodiments of the invention.

In current disk drive preamps, the write process uses write overshoot current (Iwos) with a specific overshoot duration. FIG. 5A is a schematic of the write driver 100' according to an embodiment of the invention with Iwos, and FIG. 5B is a graph of the write current pulses with Iwos generated by the write driver 100' with and without the bypass currents generated by embodiments of the invention. To achieve the overshoot current amplitude and overshoot duration a circuit similar to FIG. 5A is used. Transistor T1 is controlled by each transition of the write data (WD) in one direction, e.g., each positive transition, and T2 is controlled by each transition of WD in the opposite direction, e.g., a negative transition. In FIG. 5B, wafeform 250 is the symmetric waveform with Iwos but no bypass current, waveform 252 is the waveform with Iwos and positive offset from the bypass current sources, and waveform 254 is the waveform with Iwos and negative offset from the bypass current sources.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A preamplifier for connection to a magnetic recording disk drive inductive write head comprising:
    a write current source;
    an H-bridge connected to the write current source for connection to the write head and including a plurality of switches responsive to a data signal for directing write current in two directions to thereby generate positive and negative write pulses to the write head;
    a first selectable pair of bypass current sources not connected to the write current source for connection to the write head for directing bypass current in a first direction to the write head;
    a second selectable pair of bypass current sources not connected to the write current source for connection to the write head for directing bypass current in a second direction opposite to said first direction to the write head; and
    logic circuitry for selecting one of said bypass current pairs, whereby a selected one of said first and second bypass currents provides an offset to the positive and negative write pulses to the write head.

2. The preamplifier of claim 1 further comprising first and second terminals for connection to the write head and wherein one bypass current source of each pair is connected to one terminal and the other bypass current source of each pair is connected to the other terminal.

3. The preamplifier of claim 2 wherein the plurality of H-bridge switches comprises a first switch connected to the first terminal and a fourth switch connected to the second terminal, and a second switch connected to the second terminal and a third switch connected to the first terminal, wherein write current flows in first and fourth switches in a first direction to generate a positive write pulse and in second and third switches in a second direction opposite to said first direction to generate a negative write pulse.

4. The preamplifier of claim 1 further comprising write overshoot current circuitry comprising a write overshoot current source and a switch responsive to a transition in write current direction for directing write overshoot current to the write head.

5. The preamplifier of claim 1 wherein each pair of bypass current sources is adapted to provide a programmed value of bypass current.

6. The preamplifier of claim 1 wherein the preamplifier is adapted for connection to a disk drive system-on-a-chip (SOC) by a transmission line that includes a write path for the data signal and a serial logic path, and wherein the logic circuitry comprises:
    a register for receipt from the SOC on the serial logic path of a pair selection value representative of the pair of bypass current sources to be selected and of a digital bypass current value representative of the value of bypass current; and
    a digital-to-analog converter (DAC) coupled to the register and the pairs of bypass current sources, whereby the selected pair of bypass current sources are capable of generating the bypass current represented by said digital bypass current value.

7. The preamplifier of claim 6 wherein the preamplifier is adapted for connection to multiple write heads, and wherein said register is adapted to store multiple pair selection values and digital bypass current values.

8. A preamplifier for connection to a plurality of magnetic recording disk drive inductive write heads comprising:
    a write driver comprising:
        a write current source;
        an H-bridge connected to the write current source and having first and second terminals for connection to a selected one of the write heads, the H-bridge including a plurality of switches responsive to a data signal for directing write current in two directions to thereby generate positive and negative write pulses to the selected write head;
        a first selectable pair of bypass current sources not connected to the write current source for connection to the selected write head for directing bypass current in a first direction to the selected write head;
        a second selectable pair of bypass current sources not connected to the write current source for connection to the selected write head for directing bypass current in a second direction opposite to said first direction to the selected write head, wherein one bypass current source of each pair is connected to the first terminal and the other bypass current source of each pair is connected to the second terminal;
    a register for storing a plurality of digital pair selection values representative of the pair of bypass current sources to be selected for each write head and a plurality of digital bypass current values representative of the value of bypass current for each write head; and a digital-to-analog converter (DAC) coupled to the register and the pairs of bypass current sources for generating an analog value representative of the value of bypass current for each write head; and logic circuitry for selecting one of said bypass current pairs, whereby a selected one of said first and second bypass currents provides an offset to the positive and negative write pulses to the selected write head.

9. The preamplifier of claim 8 wherein the plurality of H-bridge switches comprises a first switch connected to the first terminal and a fourth switch connected to the second terminal, and a second switch connected to the second terminal and a third switch connected to the first terminal, wherein write current flows in first and fourth switches in a first direction to generate a positive write pulse and in second and third switches in a second direction opposite to said first direction to generate a negative write pulse.

10. The preamplifier of claim 8 wherein the write driver further comprises write overshoot current circuitry comprising a write overshoot current source and a switch responsive to a transition in write current direction for directing write overshoot current to the selected write head.

11. The preamplifier of claim 8 wherein the preamplifier is adapted for connection to a disk drive system-on-a-chip (SOC) by a transmission line that includes a write path for the data signal and a serial logic path, and wherein the register is adapted to receive, from the SOC on the serial logic path, the digital pair selection values and the digital bypass current values.

\* \* \* \* \*